April 7, 1953 E. M. SMITH ET AL 2,633,825
QUICK-ACTING RACE CONTROL GATE
Filed Jan. 19, 1948 3 Sheets-Sheet 1
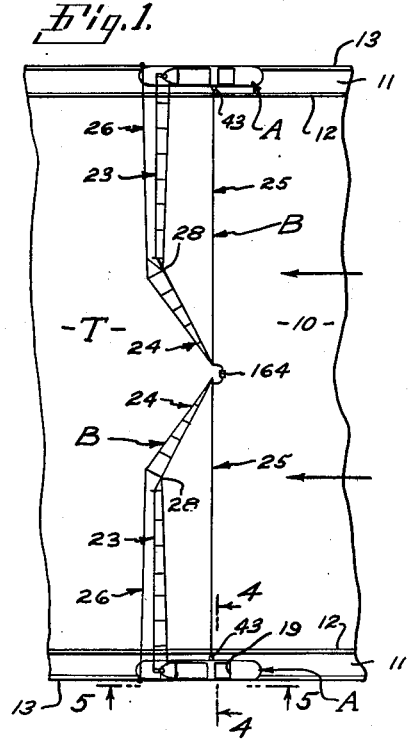
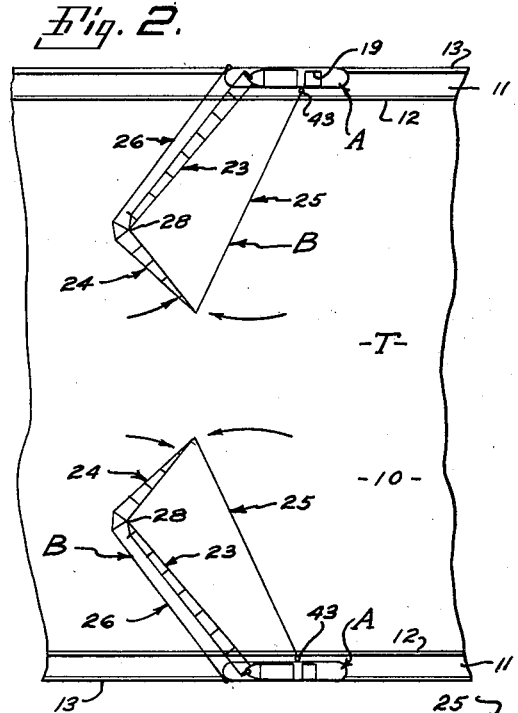
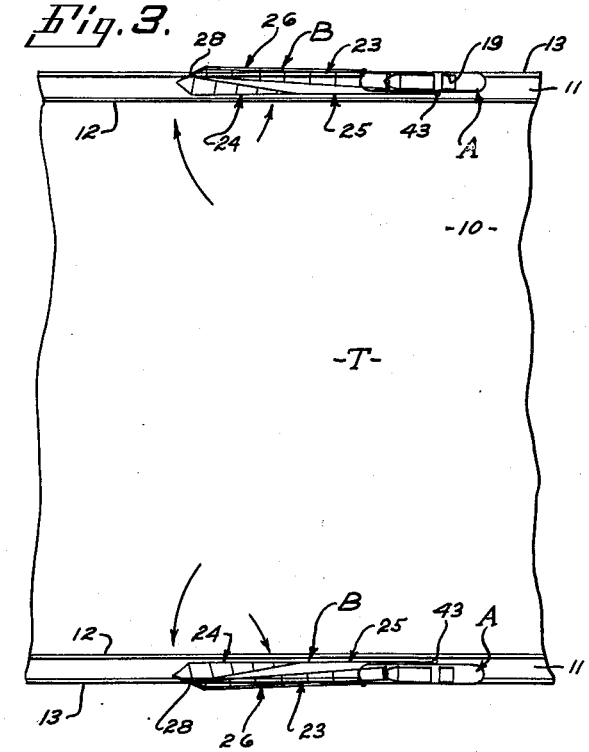
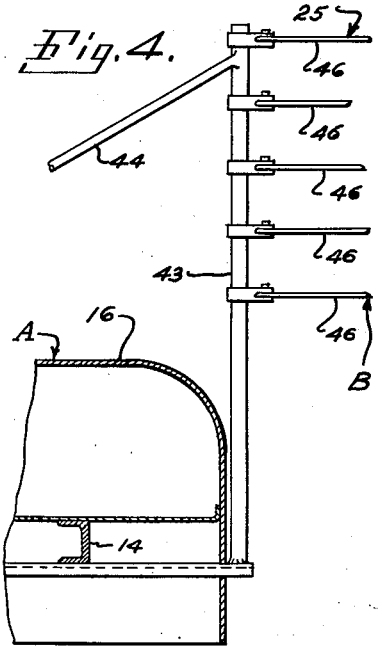
INVENTORS
EDWARD M. SMITH
CHARLES E. WHITTAKER
JOHN S. GOODWIN
BY
ATTORNEY

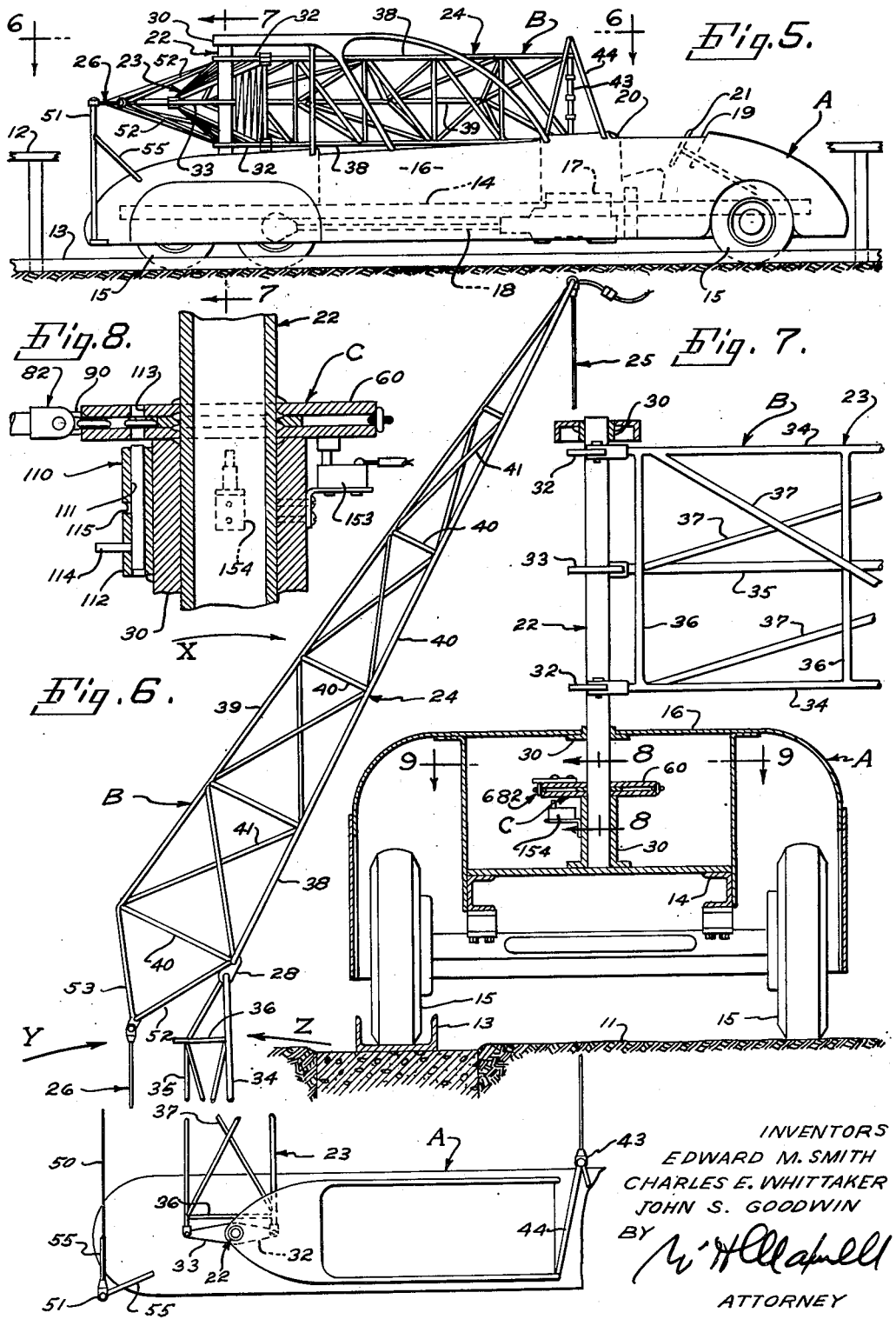

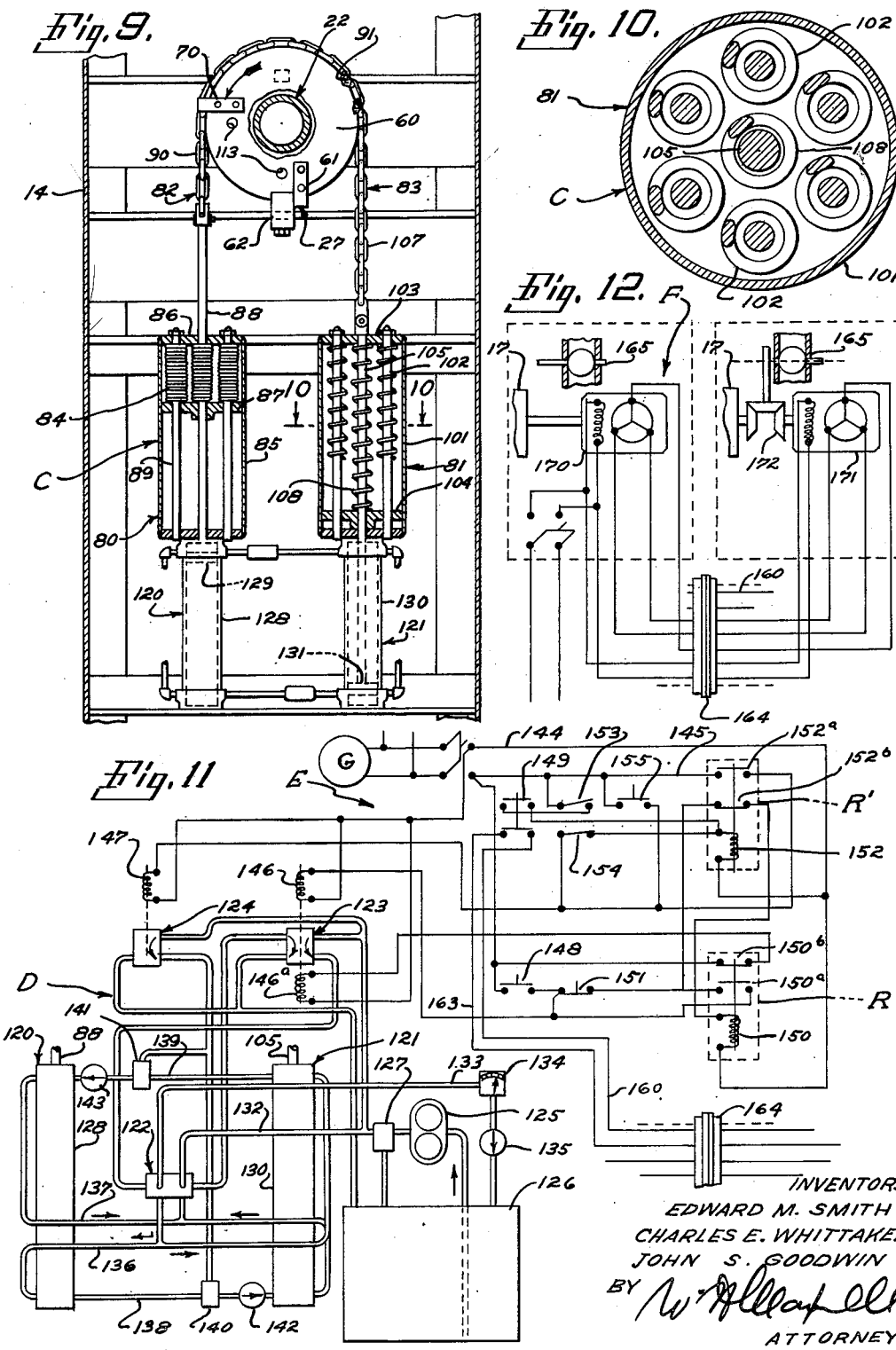

Patented Apr. 7, 1953

2,633,825

UNITED STATES PATENT OFFICE 2,633,825

QUICK-ACTING RACE CONTROL GATE

Edward M. Smith, Whittier, Charles E. Whittaker, Los Angeles County, and John S. Goodwin, Whittier, Calif., assignors to Globe Oil Tools Company, Los Nietos, Calif., a corporation of California Application January 19, 1948, Serial No. 2,974

18 Claims. (Cl. 119—15.5)

This invention relates to a quick acting race control gate and it is a general object of the invention to provide a gate for controlling races, such as horse races, which gate can be used without danger to animals being raced, and which acts quickly and without generating forces requiring heavy expensive and cumbersome construction.

The gate provided by the present invention is useful, generally, as a starting gate for races such, for example, as horse races. The construction of the present invention may be mounted stationary or in a fixed position at any desired or suitable position along a track, or it may be carried on a vehicle operatable lengthwise of a track, in which case it will operate to advantage in starting races where the animals are started in motion. Further, the present invention may be incorporated in a single unit or gate, in which case it may be proportioned to extend substantially the entire disance across the track when it is in the closed position, or it may be employed in two like or complementary units, in which case each unit or gate needs to extend only about halfway across the track. It is also significant that the structure of the present invention can be employed in or carried out in connection with gates of different styles or types, for example, it may be used in carrying out a gate construction of the general character disclosed and claimed in Patent No. 2,461,780 entitled "Starting Gate," issued February 15, 1949.

Various starting devices or gates have been proposed and used for starting races such as horse races. Most such devices present rigid sturdy gates or gate-like elements which, when accidentally engaged by a horse, or the like, are likely to injure the animal or to be injured by the animal. Further, where gates have been made of such length as to extend a substantial distance across a track, say for example, entirely across the track or even about half-way across a track, they become so long, heavy and cumbersome as to be difficult to operate and when started in motion they are slow to accelerate and when reaching the full open position they are difficult to stop, and they consequently set up forces and strains that make heavy expensive contruction necessary.

It is a general object of the present invention to provide a gate of the general character above referred to which shortens as it opens, with the result that rapid acceleration can be gained and minimum forces are required for stopping the opening movement.

Another general object of the present invention is to provide a gate of the general character refererred to wherein the forces or strains set up by the general opening movement of the gate are minimized or counteracted to a large extent by an element of the gate that moves, during part of the opening movement, rearwardly relative to the gate as a whole.

Another object of the present invention is to provide a gate construction which folds from an extended or open position to a folded closed position where it is but a fraction of the full length of the structure when it is in the open position.

Another object of the present invention is to provide a gate construction of the general character referred to in which a face of soft or cushion-like material is presented to the animals being controlled, which face can be engaged even forcibly by the animals without danger either to the animals or to the gate.

Another object of the present invention is to provide a gate construction of the general character referred to in which a resilient protective face is provided on a collapsible or folding frame which face acts to open or collapse the gate in the course of the gate being opened.

Another object of the invention is to provide a construction of the general character referred to in which a collapsible gate is combined with an opeating means that operates it from a closed or extended position to an open or collapsed position, the gate including a protective face which acts with the operating means in moving the gate from the closed to the open position.

The various objects and features of our invention will be fully understood from the following detailed description of a typical preferred form and application of the invention, throughout which description reference is made to the accompanying drawings, in which:

Fig. 1 is a plan view of a portion of a racetrack showing two units or gates embodying the present invention in operating position thereon, the gates being shown in a closed position and extending across the track, each gate extending about half-way across the track. Fig. 2 is a view similar to Fig. 1, showing the gates in a partially open position, the arrows indicating the manner in which the parts operate in the course of movement of the gates from closed position to open position. Fig. 3 is a view similar to Figs. 1 and 2, showing the gates fully open. Fig. 4 is an enlarged detailed sectional view of a portion of one of the gate constructions, being a view taken as indicated by line 4—4 on Fig. 1. Fig. 5 is a side elevation of the structure shown in Fig. 1, being an enlarged view taken as indicated by line 5—5 on Fig. 1. Fig. 6 is a plan view of the structure shown in Fig. 5, being a view taken as indicated by line 6—6 on Fig. 5. Fig. 7 is an enlarged detailed transverse sectional view taken as indicated by line 7—7 on Fig. 5. Fig. 8 is an enlarged detailed sectional view of a portion of the mechanism, being a view taken as indicated by line 8—8 on Fig. 7. Fig. 9 is an enlarged detailed sectional view as indicated by line 9—9 on Fig. 7. Fig. 10 is an enlarged detailed sectional view taken as indicated by line 10—10 on Fig. 9. Fig. 11 is a diagrammatic view of controls included in the structure of the present invention, and Fig. 12 is a a diagrammatic view illustrating the synchronous control that we have provided.

As above pointed out, the present invention can be carried out in a construction wherein the gate, as such, operates horizontally. In the drawings the invention is shown incorporated in two units each of which extends about half-way across a track T and the gate of each unit operates horizontally.

The particular track T shown in the drawings involves a track proper or course 10 over which the animals run, and there are longitudinal marginal portions 11 that adjoin the sides of the track 10 and extend parallel therewith. Suitable rails or fences 12 separate the track 10 from the marginal portions 11 and in the particular case illustrated each marginal portion 11 is equipped with a track or rail 13 for guiding a carriage or wheeled vehicle A. The two units shown in the drawings cooperate to extend entirely across the track 10 and are preferably like units and therefore but one unit will be described in detail, it being understood that such description is applicable to both units, or to two units where two units are required or used.

The present invention provides, generally, carriages A each in the form of a vehicle, preferably a self-propelled vehicle, a gate B carried by each carriage A, operating means C for each gate, a control system which, in the case illustrated, involves a hydraulic control system D combined with an electrical control system E, and control means F regulating and synchronizing the prime movers of the two carriages A.

The carriage A is in effect a base mounting for other elements of the structure and is shown in the drawings as a self-propelled vehicle involving, generally, a frame 14 supported on wheels 15 certain of which are engaged with track 13 to be guided thereby. The carriage further includes a suitable elongate body 16 and is shown provided with a prime mover in the form of an engine 17 driving certain of the wheels through a drive 18 such as is common to motor vehicles. The body is provided with a driver's compartment 19 equipped with a seat 20. A suitable steering wheel 21 and other controls may be provided at compartment 19 to be conveniently accessible to an operator riding the vehicle. It is to be observed that the elongate body 16 is supported by the frame so that when the vehicle is engaged with the rail 13 it extends parallel with or longitudinal of the track T.

The gate B provided by the present invention involves, generally, a post 22, a frame including an inner or body section 23, and an outer or tip section 24, a face 25 extending generally lengthwise of the frame and supported by the frame and carriage to extend across the track T normal thereto, a stop 26 limiting action of the tip section 24 of the frame, and a stop 27 limiting pivotal movement of the body section of the frame acting to stop the body section in an open position where it extends parallel with the track T, and acting to stop the body section in a closed position where it extends substantially normal of the track T.

The post 22 in this form or adaptation of the invention projects vertically from the carriage or from the body 16 of the carriage. The post is shown supported from the frame 14 and body 16 of the carriage A through suitable bearings 30 in such manner as to allow free rotation of the post about its longitudinal or vertical axis.

The frame of the gate B made up of the frame sections 23 and 24 is carried by the post 22 to project laterally or horizontally therefrom and when the gate is in the closed position the frame sections 23 and 24 are substantially end to end and project generally transversely of the track T whereas when the gate is open the frame sections are in side by side relation and extend substantially parallel with the carriage and, therefore, parallel with the track T. In accordance with the present invention the frame sections 23 and 24 are relatively movable or shiftable, it being preferred that they be connected by a suitable pivotal connection 28 so that they swing or hinge relative to each other about a vertical axis, the inner end of the outer or tip section 24 being pivotally connected to the outer or projecting end of the body section 23.

The frame sections 23 and 24 are preferably fabricated or skeleton-like structures formed of light tubing or other structural elements, each section of the frame being so formed, shaped and proportioned as to be a substantially rigid unit sufficiently strong and rigid to project and operate in the manner illustrated throughout the drawings.

In the particular case illustrated the body section 23 of the frame of the gate B includes, generally, vertically spaced arms 32 projecting horizontally from the post 22 and projecting rearwardly of the direction of travel of the carriage A when the gate is in the closed position. A third arm 33 projects horizontally from the post midway between the arms 32 and projects forward when the gate is in the closed position. The frame section 23 further includes horizontal beams 34 that have their inner ends joined to the arms 32 and which project horizontally from the outer ends of the arms 32. A third or stiffening beam 35 has its inner end joined to the outer end of arm 33 and extends horizontally in the same general direction as the beams 34. Suitable spacers 36 and braces 37 join, space and brace the beams 34 and 35, establishing a rigid horizontally disposed structure projecting the desired distance horizontally from the post 22. In the preferred construction the stiffening beam 35 may approach the beams 34 as it projects outwardly with the result that the frame section is somewhat narrower in a horizontal direction at its outer end than at its inner end where it is joined to the post by the arms.

The outer or tip section 24 of the frame may be similar, generally, in construction to the section 23, that is, it may involve upper and lower beams 38 spaced apart vertically the same as the beams 34. Beams 38 have their inner ends pivotally joined to the outer ends of the beams 34 by the pivotal connections 28. The frame section 24 has a stiffening beam 39 offset horizontally from the beams 38 in a forward direction or in the direction in which the carriage moves, and located about midway vertically between the beams 38. Suitable structural members such as spacers 40 and braces 41 connect the beams 38 and 39 to establish a rigid structure of the desired length. The frame section 24 like the frame section 23 may be tapered somewhat from its inner end which is connected to the body section 23, to its outer or tip end where it may converge to a point, as shown throughout the drawings. It is to be observed that in the preferred relationship of parts shown throughout the drawings the tip or outer section 24 of the frame is somewhat shorter than the inner or body section, being but little more than about half the length of the body section. This relationship may, of course, vary considerably in different designs incorporating the present invention. However, it is desirable, generally, that the relationship of frame parts be substantially as shown in the drawings.

The face 25 of the gate is a soft or cushion-like structure extending generally lengthwise of the frame when the frame sections 23 and 24 are extended or substantially end to end, as shown in Fig. 1 of the drawings. When the gate is closed and the frame sections thereof are arranged substantially end to end, the frame sections serve to hold the face 25 of the gate extended and preferably under tension, so that it extends horizontally. In the arrangement illustrated in the drawings the inner end of the face 25 is joined or anchored to the carriage A at a point adjacent the point where the frame is pivoted to the carriage. In the case illustrated the face has its inner end anchored at a point spaced somewhat from the pivot of the frame in a direction along the carriage rearward of the post 22, while the outer end of the face is joined to the outer or tip end of the tip section 24 of the frame. The points of connection at the ends of the face 25 are so located that when the gate is in the closed position the face not only extends horizontally but is normal to the longitudinal axis of the track T.

It will be apparent that the frame construction of frame section 24 is such as to afford a suitable support for carrying the outer end of the face 25, as shown throughout the drawings. The inner end of the face 25 may be supported at or from the carriage A in any suitable manner. In the particular case illustrated a suitable upright or standard 43 is shown projecting vertically at the side of the carriage body 16 adjacent the track 10 and suitable braces 44 stabilize the standard 43.

In accordance with the broader principles of the invention the face 25 may vary widely in form and construction and various materials may be used in its construction. In the particular case illustrated the face is an elastic structure and is preferably formed of a plurality of bands 46 of resilient or elastic material, which bands extend independently of each other from the standard 43 to the tip end of the frame section 24. In the case illustrated the structure involves five equally spaced bands 46 and the arrangement is such that the bands are parallel with each other. In carrying out the invention the bands are preferably formed of a soft material that will not be injurious to animals that may contact them. In practice it has been found practical to form the bands of rubber or rubber-like material, and to proportion them so that they are under such tension so as to be substantially horizontal when the gate is in the closed position. In the preferred form of the invention the bands are under substantial tension when the gate is in the closed position, and thus the face of the gate supplements the means C in operating the gate from the closed to the open position.

The stop 26 incorporated in the gate construction serves primarily to limit rearward pivotal movement of the tip section 24 of the frame relative to the body section 23 of the frame when the body section 23 has been stopped in the closed position and when the face of the gate tends to swing the tip section 24 rearwardly or in the direction indicated by the arrow X in Fig. 6 of the drawings. In the preferred form of the invention the stop 26 is a flexible line or cable 50, the inner end of which is secured to the carriage A by a suitable anchor 51 while the outer end is secured to the inner end of the frame section 24 through a suitable bracket.

The bracket illustrated in the drawings holding the line 50 involves legs 52 that are joined to the inner ends of beams 38 and which project forward and converge to a point where they are connected and are joined to a brace 53 that projects from the inner end of beam 39. The line 50 connects to the bracket where the legs 52 connect with the brace 53. Through this construction the outer end of the line 50 is coupled to the inner end of the frame section at a point suitably removed from the axis of the pivotal connection 28 so that the line has the action illustrated throughout the drawings.

The anchor 51 to the carriage A is preferably located forward of the post 22 of the gate or at the forward end portion of the body 16 of the carriage and it may involve a post projecting from the body and stabilized by suitable braces 55 as shown in Figs. 5 and 6 of the drawings.

The stop 27 operates to limit pivotal movement of frame section 23 between the positions shown in Figs. 1 and 3 of the drawings. The stop, as shown in the drawings, involves a disc-shaped member 60 fixed on the post 22 of the gate to rotate therewith and therefore to move with the frame section 23 as it moves. The member 60 carries a stop 61 located to engage a fixed stop 62 supported from the frame of the carriage A. The stops 61 and 62 cooperate to positively stop turning movement of disc 60 when the frame 23 has been moved in the direction indicated by the arrow Y to the position indicated in Fig. 6 of the drawings.

It is to be observed that when the gate is in the closed position shown in Figs. 1, 5 and 6 of the drawings the frame section 23 extends laterally and somewhat forwardly from the carriage while the frame section 24 extends from the outer end of the frame section 23 laterally and somewhat rearwardly with the result that the outer or tip end of the frame section 24 is rearward of the axis of the pivotal connection 28 between the sections 23 and 24. The face 25 of the gate, being connected between the carriage A and the outer or tip end of section 24 and being under tension normally tends to draw the outer or tip end of frame section 24 toward the carriage A and, consequently, tends to cause pivotal movement between the frame sections and consequent forward movement of the pivotal connection 28 in the direction indicated by the arrow Z in Fig. 6 of the drawings.

As the gate operates from the closed position to the open position the face 25 of the gate exerts pressure on the sections of the gate and consequently tends to fold the gate sections together from the position shown in Fig. 1 to that shown in Fig. 3, it being preferred to proportion the bands 46 of the face 25 so that this force or tendency to operate the gate sections diminishes as the gate reaches the open position and is practically exhausted or expanded by the time the gate is fully open, as shown in Fig. 3 of the drawings leaving the bands under only sufficient tension to prevent them from sagging.

It will be observed that as the gate moves from the closed position to the open position the gate section 23 moves forward or in the direction indicated by the arrow Z while the gate section 24 moves rearwardly relative to the outer end of gate section 23 in that it swings in the direction indicated by the arrow X in Fig. 6, this being particularly true during the initial stages of the closing operation. During the final stages of the closing operation the tip section 24 is moving in the same general direction as the section 23. However, at this time the forces tending to move the gate sections, that is, the face 25 of the gate and the means C hereinafter described, have diminished so that the movement of the gate sections is decreasing.

As the gate moves toward the open position its over-all length is reduced, due to the frame sections folding together with the result that the center of gravity of the gate structure as a whole moves closer to the pivotal axis of the gate so that no excessive forces need counter-acting as the gate is brought to a stop in the open position. A suitable stop may be incorporated in the operating means C checking the opening movement of the gate and bringing it to a stop by the time it reaches the full open position. This means may be supplemented by the stop means 27 by a stop 70 on the member 60 cooperating with the stop 62 to positively stop the section 23 of the gate when it reaches the full open position.

The particular operating means C shown in the drawings is of the type disclosed and claimed in application entitled "Starting Gate," Serial No. 689,910, filed August 12, 1946, and it includes, generally, a drive or power unit 80 and a check or braking unit 81. An operating connection 82 couples the unit 80 with the post 22 of the gate and an operating connection 83 couples the unit 81 with the post 22 of the gate.

The power unit 80 is shown as involving a plurality of compression springs 84 arranged in a case 85 between a head 86 on the case and a head 87 slidable in the case. The head 87 is fixed on an operating rod 88 that projects from the case. In the preferred arrangement the several springs 84 are guided on suitable rods 89. The operating connection 82 is shown as including a flexible member or chain 90 coupled to the rod 88 and suitably coupled to the post 22 of the gate. In the particular case illustrated the member 60 hereinabove referred to is a disc-shaped member fixed on the post 22 and the chain 90 is wrapped around the pheriphery of member 60 and is fixed thereto as at 91. The various parts are arranged and proportioned so that when the gate is in closed position the chain 90 is wrapped onto member 60, causing head 87 to approach head 86 holding the springs 84 compressed. The springs 84 being compressed act with the face 25 of the gate in normally yieldingly tending to operate the gate from the closed position to the open position. The springs 84 when fully compressed may stop the mechanism in the closed position.

The check or braking unit 81 is preferably a spring unit involving a case 101 carrying springs 102 that act between a head 103 on the case and a head 104 slidable in the case. The head 104 is carried on a rod 105 which is coupled to the member 60 by a flexible connection such as a chain 107. The several springs 102 are so proportioned as to be engaged by the head 104 only as the gate approaches the open position and as the gate moves finally to the open position the springs 102 become compressed and thus exert force resisting the action of the springs 84 and of the face 25. The parts are preferably related and proportioned so that a substantially balanced condition or state of equilibrium is reached when the gate is about two-thirds open and so that movement of the gate is checked when it reaches the fully open position. The springs 102 when fully compressed may stop the mechanism in the open position. A spring 108 is incorporated in the unit 81 normally yieldingly holding the head 104 away from the springs 102. This spring 108 serves to maintain suitable tension in the mechanism.

In the construction illustrated a safety latch 110 is provided for releasably locking the gate in open or closed position. This latch is shown as including a bolt 111 carried in a guide 112 so that it can be operated to a position where it enters openings 113 in member 60. An operating handle 114 on the bolt is designed to enter a J-slot 115 which holds it in the engaged position. Immediately before operation of the apparatus the safety latch 110 may be released, thus conditioning the gate for opening movement.

Any suitable control system may be provided for the structure hereinabove described. In the case illustrated the particular control system is of the type described and claimed in the said Patent No. 2,461,780. This particular system involves a hydraulic system D and the electrical system E. The hydraulic system D involves, generally, two oppositely acting cylinder and piston units 120 and 121, a main control valve 122, an operating or setting valve 123, and a release valve 124. The system further includes other elements or accessories such as a pump 125 for delivering fluid under pressure, a reservoir 126 from which the pump is supplied, a pressure regulating valve 127 through which the pump delivers fluid to the system and various other parts all of which will be apparent from the drawings.

Cylinder and piston unit 120 involves, generally, a cylinder 128 and a piston 129 operating in the cylinder and carried by the rod 88 which extends from unit 80. Unit 121 includes a cylinder 130 and a piston 131 operating in the cylinder and carried by rod 105 of unit 81.

The pressure generating device or pump 125 will operate to deliver fluid at the desired pressure and in the necessary quantity and may be driven by any suitable source of power. The pump receives fluid from reservoir 126 and delivers it to line 132 which conducts it to inlet valve 122. A drain line 133 conducts fluid from the outlet of valve 122 to reservoir 126 through a variable orifice device 134 and a check valve 135.

Valve 122 is such as to be operable between an open position to deliver fluid from line 132 to line 136 while it is being exhausted by line 137, and a closed position where line 136 and 137 are closed. The line 136 extends to the outer end of cylinder 128 and to the inner end of cylinder 130 while line 137 extends to the inner end of cylinder 128 and to the outer end of cylinder 130. Thus fluid can be admitted to one end of one of the hydraulic units while being exhausted from the other end when valve 122 is in the open position.

Through the hydraulic system fluid under pressure from the pump 125 can be utilized to actuate hydraulic units 120 and 121 so the unit 80 of means C is operated in a manner to put the springs 84 under compression, as shown in Fig. 9 and on reaching the position shown in Fig. 9 the cylinders of units 120 and 121 are filled with fluid so that the hydraulic parts or units serve as a lock holding the mechanism in the position just described, in which position the gate is closed. When the units 120 and 130 operate to close the gate the fluid exhausted from the units passes through line 133 and the flow restricting means 134. The flow restricting means can be regulated to prevent excessively rapid initial travel of the gate, and may be so regulated as to gain the desired rate of movement of the gate.

To operate valve 122 to a position where the units 120 and 121 operate to move the parts to the closed position shown in Figs. 1 and 9, we provide the loading or setting valve 123. This valve is connected with the source of fluid under pressure, with the reservoir and with control cylinders, or the like, at the ends of valve 122.

Valve 123 has three positions, one a closing position where it admits fluid under pressure to one side of valve 122 so that valve 122 operates to admit fluid under pressure to line 136 moving piston 129 in and piston 131 out, one an opening position where it admits fluid pressure to the other side of valve 122 so that valve 122 operates to close line 136 and the third a neutral position where all connections are closed.

To facilitate unloading of cylinders 128 and 130 so that the apparatus moves rapidly when released, we provide a bypassing connection 138 between the outer ends of cylinders 128 and 130 and a bypass connection 139 between the inner ends of these cylinders. These bypass connections are provided with valves 140 and 141, respectively, which are opened when the valve 124 opens to release the mechanism and check valves 142 and 143 are provided to prevent flow in the bypass connections except in the desired directions.

The electrical control E provides for convenient and effective operation of valves 123 and 124. It is energized by a circuit carried by lines 144 and 145 and it includes, generally, coils or windings 146 and 146ª for operating valve 123, a winding 147 for operating valve 124, a switch 148 for closing the circuit so that winding 146 is energized, and a switch 149 controlling the circuit to the winding or coil 147. The switch 148 is located convenient to the operator of the carriage and controls a relay R having a winding 150 energized when switch 148 is closed.

When winding 150 of the relay R is energized contacts 150ª of the relay are closed completing the circuit through the coil 146 operating valve 123 to the closing position so that fluid is handled by the hydraulic system in a manner to move the parts to the position shown in Fig. 9. The relay R is connected in such manner that momentary operation of switch 148 throws the circuit into operation and it will remain operating so that the parts reach the position shown in Fig. 9. In order that the operator may interrupt closing of the gate whenever desired, a switch 151 is provided in the circuit to release the winding 150. When switch 151 is thus operated, winding 150 of relay R is de-energized and contacts 150ᵇ of the relay are closed completing the circuit through coil 146ª operating valve 123 to the opening position so that fluid is handled by the hydraulic control in a manner to lock or hold the mechanism closed subject to release by the valve 124.

The switch 149 controls the relay R' which has a winding 152 energized when the switch 149 is closed and when the winding 152 is energized contacts 152ª of the relay are closed completing the circuit through the coil 147 and operating valve 124 which puts the hydraulic system in the reversed position or in condition to release so that the parts move rapidly from the position shown in Fig. 1 to that shown in Fig. 3.

When winding 152 of relay R' is de-energized contacts 152ᵇ of the relay are closed completing the circuit to winding 150 of relay R. It will be apparent that the winding of relay R can only be energized when the winding of relay R' is de-energized so that when the mechanism is released as by closing of switch 149 the valve 123 cannot be moved to the closing position but remains in the opening position under control of winding 146ª.

Limit switches 153 and 154 are provided in the circuits to winding 152 of relay R' so that the circuit to switch 149 is completed only when the mechanism is fully closed and so that the circuit to winding 152 of relay R' is broken when the mechanism is fully opened. Limit switch 153 is a normally open switch and related to the member 60 so as to be closed only when the mechanism reaches the fully closed position. Switch 153 is in series with switch 149 so that the winding 152 of relay R' can only be operated to release the mechanism when the mechanism is fully closed. Limit switch 154 is a normally closed switch and is related to the member 60 to be opened only when the member reaches the fully open position, the position shown in Fig. 3. The switch 154 is connected to relay R' in such a manner that momentary operation of switch 149 throws the circuit into operation as above described, so that the winding is energized until the member 60 reaches the open position. In practice we may provide a switch 155 directly controlling the winding 152 and by-passing the switches 153 and 149 so that the mechanism may be tripped in between the two extreme positions. Switch 155 is an auxiliary switch that is not ordinarily needed or used.

It will be apparent that the two carriages A shown in the drawings may be released together or simultaneously. In practice, the switches 149 of the two units or carriages may be mechanically coupled so that they operate simultaneously. To operatively couple the switches 149 of the two units a line 160 is carried by a cable that connects the two carriages.

A disconnect plug 164 is provided between the two gates making the necessary connections between the sections of the line 160 carried by the two gates. When this circuit is broken as by opening of the gates the switches 154 hold the relays R' in operation until the gates are completely opened.

The means F serves to regulate and synchronize the prime movers or engines 17 and 17' of the two carriages so that the carriages operate in unison or in synchronism. In the arrangement illustrated each engine is under control of a throttle 165, or the like, so that it can be operated at any desired speed. Manual controls for the throttle may be located at or near the seats of the carriages.

The synchronous connection involved in means F connecting engines 17 and 17' may be any suitable synchronous connection, although it is preferably one which contemplates an electrical connection between the engines, or parts in connection therewith, through wires, which wires can connect to the carriages through the cables carried by the gates and the disconnect plug 164 where the gates adjoin so that the connection between the carriages, even though electrical, is concealed and is as simple as possible. The cable connection between the gates involves suitable flexible electrical cables carried by the gates and joined by the disconnect plug 164. The plug 164 releases when the gates are opened.

In the case illustrated we show a master synchronous motor 170 coupled to and driven by the engine 17 of one carriage so that its speed of operation is directly related to that of the engine. A corresponding or similar servant synchronous motor 171 is coupled with the engine 17' of the other carriage through a differential control device 172 which control device operates the throttle 165 of engine 17'. From an examination of Fig. 12 it will be apparent that when the engine 17 operates at any speed the engine 17' of the other carriage will operate at a corresponding speed and that if the engine of one is not operating at the same speed as the engine of the other the differential mechanism 172 functions to actuate the throttle of engine 17' varying the speed of that engine until it corresponds with that of the other. The control 172 is indicated as involving a gear 180 driven by the engine 17', a gear 181 driven by motor 171 and a planetary gear 182 coupling the gears 180 and 181 and operating connected with the throttle of engine 17'.

From the foregoing description it is believed that the operation of the apparatus will be fully understood and it will be apparent that the folding or collapsible gate construction self-energized through the action of the face of the gate cooperates with the means C, as the gate is moved from the closed to the open position, so that all of the force opening the gate is not delivered through means C and, consequently, the entire structure can be made very light. By providing a light construction and by providing a collapsible construction folding in as it opens, the entire apparatus may be of simple, light construction, and it is such that it can be operated with a minimum of power and a maximum of speed all without excessive strain, and it is possible to bring the gate to a stop in the fully opened position rapidly and without danger of racking or overstraining any of the parts.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A control gate of the character described operating between a folded and an extended position and including, a frame having an elongate body section, an elongate outer section, and means pivotally connecting the inner end of the outer section to the outer end of the body section, means pivotally supporting the body section at its inner end, the frame being operable between an extended position where the outer section projects beyond the outer end of the body section and is inclined relative to the body section and a collapsed position where the sections are side by side, and an elongate resilient barrier anchored at its inner end adjacent the means supporting the inner end of the body section and having its outer end secured to the outer end portion of the outer section, the barrier being spaced from one side of the frame and being generally parallel therewith when the frame is in the extended position.

2. A control gate of the character described operating between a folded and an extended position and including, a frame having an elongate body section, an elongate outer section, and means pivotally connecting the inner end of the outer section to the outer end of the body section, means pivotally supporting the body section at its inner end, the frame being operable between an extended position where the outer section projects beyond the outer end of the body section and a collapsed position where the sections are side by side, and an elongate resilient barrier anchored at its inner end adjacent the means supporting the inner end of the body section and having its outer end secured to the outer end portion of the outer section, the barrier being spaced from one side of the frame and being generally parallel therewith when the frame is in the extended position, the outer section being shorter than the body section.

3. A control gate of the character described operating between a folded and an extended position and including, a base, a frame having an elongate body section, an elongate outer section, and means pivotally connecting the inner end of the outer section to the outer end of the body section, means pivotally connecting the inner end of the body section to the base, the frame being operable between an extended position where the outer section projects beyond the outer end of the body section and a collapsed position where the sections are side by side, power means operating the frame from the extended position to the collapsed position, and an elongate resilient barrier having its inner end anchored to the base and having its outer end secured to the outer end portion of the outer section, the barrier being spaced from one side of the frame and being generally parallel therewith when the frame is in the extended position.

4. A control gate of the character described including, a base, an elongate inner section, means pivotally connecting the inner end of the inner section to the base for horizontal pivotal movement of the inner section relative to the base, an elongate outer section, means pivotally connecting the inner end of the outer section to the outer end of the inner section for horizontal pivotal movement of the outer section relative to the inner section, and an elongate flexible barrier supported by and extending between the base and the outer end portion of the outer section to remain substantially straight therebetween as the sections operate relative to each other.

5. A control gate of the character described including, a base, an elongate inner section, means pivotally connecting the inner end of the inner section to the base for horizontal pivotal movement of the inner section relative to the base, an elongate outer section, means pivotally connecting the inner end of the outer section to the outer end of the inner section for horizontal pivotal movement of the outer section relative to the inner section, and an elongate resilient flexible barrier having one end anchored adjacent the means connecting the inner section and base and being carried by the outer end portion of the outer section to remain substantially straight and spaced from the sections as the sections operate relative to each other.

6. A control gate of the character described including, a base, a folding frame carried by the base and adapted to operate between a collapsed position adjacent the base and an operating position projecting from the base, the frame including a rigid inner section having its inner end pivoted to the base, an outer rigid section having its inner end pivoted to the outer end of the inner section, and an elongate flexible barrier having its inner end anchored adjacent the point where the inner section connects to the base and supported by the outer end portion of the outer section, the base being straight and spaced from one side of the frame when the frame is in operating position.

7. A control gate of the character described for operation in connection with a track and operating between a folded position clear of the track and an extended position extending transversely of the track including, a frame having a rigid elongate body section, a rigid elongate outer section, means pivotally connecting the inner end of the outer section to the outer end of the body section, means pivotally supporting the body section at its inner end, the frame being operable between an extended position where the outer section projects beyond the outer end of the body section and a collapsed position where the sections are side by side, and an elongate barrier having its inner end anchored at a point adjacent the inner end of the body section and having its outer end secured to the outer section, the face being spaced from one side of the frame and extending normal to the track when the frame is in the extended position.

8. A control gage of the character described for operation in connection with a track and operating between a folded position clear of the track and an extended position extending transversely of the track including, a frame having an elongate rigid pivotally mounted body section, an elongate rigid outer section, means pivotally connecting the inner end of the outer section to the outer end of the body section, means pivotally supporting the body section at its inner end, the frame being operable between an extended position where the outer section projects beyond the outer end of the body section and a collapsed position where the sections are side by side, and an elongate barrier having its inner end anchored at a point adjacent the inner end of the body section and having its outer end secured to the outer end portion of the outer section so the barrier is straight and extends normally across the track when the frame is extended, the barrier including a plurality of elastic bands.

9. A control gate of the character described including, an elongate inner section, means pivotally supporting the inner section at its inner end, an elongate outer section, means pivotally connecting the inner end of the outer section to the outer end of the inner section, means stopping pivotal movement of the outer section in one direction relative to the inner section with the outer section projecting beyond the outer end of the inner section, and an elongate barrier anchored at its inner end at a point adjacent the first mentioned means and having its outer end secured to the outer end portion of the outer section, the barrier being under tension and normally tending to move the outer section in said direction relative to the inner section.

10. A control gate of the character described including, a base, an elongate body section, means pivotally connecting the inner end of the body section to the base, an elongate outer section, means pivotally connecting the inner end of the outer section to the outer end of the body section, a member anchored to the base and attached to the outer section stopping pivotal movement of the outer section in one direction relative to the body section with the outer section projecting beyond the outer end of the body section, and an elongate barrier having its inner end anchored adjacent the first mentioned means and having its outer end secured to the outer end portion of the outer section, the barrier being spaced from the connection between the sections and normally tending to move the outer section in said direction relative to the body section.

11. In combination, a gate including, an elongate body section, means pivotally supporting the body section at its inner end, an elongate outer section, means pivotally connecting the inner end of the outer section to the outer end of the body section, the sections being substantially end to end when the gate is in working position, and an elongate resilient barrier having its inner end anchored at a point adjacent the inner end of the body and having its outer end attached to the outer end portion of the outer section, and means operating the gate about the axis of the first mentioned means, the barrier of the gate being spaced from the connection between the sections and acting to pivot the outer section relative to the body section as the gate is operated to the working position.

12. In combination, a base, a gate including, an elongate body section, means pivotally connecting the inner end of the body section to the base, an elongate outer section, means pivotally connecting the inner end of the outer section to the outer end of the body section, the sections being substantially end to end when the gate is in operating position, and an elongate barrier having its inner end anchored to the base and having its outer end attached to the outer end portion of the outer section, and means operating the gate about the axis of the first mentioned means, the barrier being elastic and acting to fold the outer section relative to the body section as the gate is operated.

13. In combination, a base, a gate including, an elongate body section, means pivotally connecting the inner end of the body section to the base, an elongate outer section, means pivotally connecting the inner end of the outer section to the outer end of the body section, the sections being substantially end to end when the gate is in one position, means limiting pivotal movement of the outer section in one direction relative to the body section, and an elongate resilient barrier having its inner end anchored to the base and having its outer end attached to the outer end portion of the outer section, and means operating the gate about the axis of the first mentioned means, the barrier of the gate being spaced from the connection between the sections and acting to pivot the outer section relative to the body section as the gate is operated.

14. A mobile unit for use at a race track including, a carriage disposed at one side of the track and movable longitudinally of the track, and a gate on the carriage and including, a horizontally disposed inner sections pivotally connected to the carriage, a horizontally disposed outer section pivotally connected to the outer end of the inner section to project therebeyond when the inner section is disposed transversely of the track, and an elongate resilient face anchored to the carriage at a point spaced from the inner end of the inner section, the barrier being attached to the outer end portion of the outer section.

15. A mobile unit for use at a race track including, a carriage at one side of the track movable longitudinally of the track, and a gate on the carriage including, an elongate rigid inner section, a pivotal connection between the inner section and the carriage, an elongate rigid outer section pivotally connected to the outer end of the inner section, an elongate elastic barrier having its inner end anchored to the carriage at a point spaced horizontally from the pivotal connection and having its outer end attached to the outer end portion of the outer section, and a stop limiting pivotal movement of the outer section relative to the inner section in the direction of the barrier, the barrier being spaced from the connection between the sections and extending normal to the track when the outer section is positioned by the stop.

16. A mobile unit for use at a race track including, a carriage at one side of the track movable longitudinally of the track, and a gate including, an inner section, a vertical pivotal connection between the inner section and the carriage, an outer section pivotally connected to the outer end of the inner section, an elongate elastic barrier having one end anchored to the carriage at a point spaced horizontally from the pivotal connection and having the other end attached to the outer end portion of the outer section, means operating the gate about the first mentioned pivotal connection, and a stop member attached to the outer section and to the carriage limiting pivotal movement of the outer section relative to the inner section in the direction of the barrier, the barrier being normal to the track and spaced horizontally from one side of the gate when the gate is closed.

17. A mobile unit for use at a race track including, a carriage adapted to move forward at one side of the track longitudinally of the track, and a horizontally operating gate on the carriage including, an elongate rigid inner section, a vertical pivotal connection between the inner section and the carriage, an elongate rigid outer section, a vertical pivotal connection between the inner end of the outer section and the outer end of the inner section, an elongate elastic barrier having one end anchored to the carriage rearward of the first mentioned pivotal connection and having the other end attached to the outer end of the outer section, and a stop member attached to the outer section and to the carriage forward of the first mentioned pivotal connection limiting pivotal movement of the outer section relative to the inner section in the direction of the barrier, the barrier being normal to the track and spaced horizontally from one side of the gate when the gate is closed.

18. A unit for use at a race track including a carriage adapted to move forward longitudinally of the track at one side of the track, a horizontally disposed collapsible gate pivotally mounted on the carriage and movable from an extended position transverse of the track and a collapsed position confined to the edge portion of the track, and means operating the gate between said positions, the gate including pivotally connected rigid sections and a resilient barrier carried by the section normally tending to operate the sections to aid said means in moving the gate from the extended position to the collapsed position, the barrier having one end anchored to the carriage and the other end attached to the outer end portion of the outermost gate section and being spaced forward of the gate sections when the gate is transverse of the track and the carriage is in operation.

EDWARD M. SMITH.
CHARLES E. WHITTAKER.
JOHN S. GOODWIN.

REFERENCES CITED

The following references are of record in the file of this patent:

UNITED STATES PATENTS

| Number | Name | Date |
|---|---|---|
| 479,457 | Peterson | July 26, 1892 |
| 2,324,726 | Sawyer | July 20, 1943 |
| 2,461,780 | Smith et al. | Feb. 15, 1949 |
| 2,497,370 | Phillips | Feb. 14, 1950 |